United States Patent [19]

Mallick, Jr. et al.

[11] Patent Number: 5,067,044
[45] Date of Patent: Nov. 19, 1991

[54] SENSOR FOR DETECTING A QUENCH IN A SUPERCONDUCTOR USING AN OPTICAL COUPLING

[75] Inventors: George T. Mallick, Jr., Monroeville; James R. Logan, Hampton Township, Allegheny County; David Marschik, Murrysville, all of Pa.

[73] Assignee: Westinghouse Electric Corp., Pittsburgh, Pa.

[21] Appl. No.: 489,137

[22] Filed: Mar. 5, 1990

[51] Int. Cl.$^5$ .............................................. H02H 9/00
[52] U.S. Cl. ...................................... 361/19; 361/141; 324/96; 505/850
[58] Field of Search .................. 361/19, 141; 505/850, 505/881; 340/870.28; 324/96; 250/231.13–231.18

[56] References Cited

U.S. PATENT DOCUMENTS

| | | | |
|---|---|---|---|
| 4,271,443 | 6/1981 | Nöther | 505/850 |
| 4,356,448 | 10/1982 | Brogardh et al. | 324/244 |
| 4,371,943 | 2/1983 | Woods | 361/141 |
| 4,777,437 | 10/1988 | Tashiro | 361/19 |
| 4,978,922 | 12/1990 | Mallick, Jr. | 361/19 |
| 4,996,472 | 2/1991 | Mallick, Jr. | 361/141 |

FOREIGN PATENT DOCUMENTS 230303 10/1986 Japan .................................. 505/850

*Primary Examiner*—Steven L. Stephan
*Assistant Examiner*—Adolf Berhane
*Attorney, Agent, or Firm*—Michael G. Ranian

[57] ABSTRACT

A quench detector for a superconducting coil is provided which utilizes an optical coupling and a rotary encoder. The presence of a resistive voltage in the superconducting coil created by a quench will cause a rotatable readout coil to move. Movement of the readout coil will be detected by light passing through or reflected by an optical encoder, which will interrupt or transmit light passing from one or more light sources towards one or more light sensors. Preferred embodiments utilize optic fibers for the light sources and sensors, which are unaffected by the high magnetic fields or hostile environment of the superconductor coil.

18 Claims, 3 Drawing Sheets

SENSOR FOR DETECTING A QUENCH IN A SUPERCONDUCTOR USING AN OPTICAL COUPLING

FIELD OF THE INVENTION

The present invention relates to a sensor for detecting a quench in a superconductor and, more particularly, to a sensor utilizing an optical coupling.

BACKGROUND OF THE INVENTION

Superconducting magnets and inductors are capable of generating high magnetic fields and thereby storing large amounts of energy. Superconducting inductors are very efficient for these purposes because no energy is lost to resistive or joule heating in the superconducting current path. Every superconducting material has a critical temperature $T_c$ for a given ambient magnetic field above which the material is no longer superconducting. If a region of a superconducting conductor loses its superconducting property (i.e., becomes normal or quenches) while current is flowing in the conductor, joule heating occurs in the normal or nonsuperconducting region. If the region is small enough, the small amount of heat will be dissipated and the region will return to its superconducting state.

If the region is large, such that sufficient joule heating occurs and overcomes the system's ability to dissipate the heat, the normal zone will propagate and grow larger, causing a catastrophic condition which can result in severe damage to the inductor or magnet, as even more energy is dissipated in portions of the inductor or magnet. This runaway condition can result in the uncontrolled dumping of the entire magnetic energy of the inductor or magnet, causing damage to itself and possibly to the load. It could also result in a service outage of the inductor or magnet, which could be intolerable if the inductor or magnet where part of a device having a critical military application. Early detection of a quench, however, permits the energy stored in the magnet or inductor to be dissipated in a controlled fashion. The energy can be dissipated in a variety of ways such as through dump resistors or by making the entire magnet or inductor go normal. Catastrophic physical damage due to overheating is therefore avoided.

Generally, a superconducting inductor is any current path composed of a superconducting material since any current path has a self-inductance. Superconducting inductors, and especially superconducting energy storage inductors, are generally configured as coils called solenoids or toroids. Superconducting magnets, which are a special case of superconducting inductors, often have more complex shapes, so as to appropriately shape the magnetic field they produce.

Several techniques exist for detecting and locating normal regions in a superconducting magnet or inductor. The principle technique has been the use of a series of voltage taps. Voltages are measured by voltmeters at various points along the coil of the superconducting material, with the objective of correlating changes in voltage caused by the change in resistivity due to the creation of a normal region. A severe drawback with using voltage taps is that in addition to the resistive voltage associated with a normal zone, a superconducting inductor produces inductive voltages resulting from the charging and discharging of the coil. These "common mode" inductive voltages are variable and change with any changes in the magnetic field. Also, since normal zones must be detected when they are small, the resistive voltage resulting from a quench is very small, typically less than a volt; whereas the common mode inductive voltage between two voltage taps is typically much larger and can be tens of kilovolts. If voltage taps are used, some technique must be utilized to eliminate the inductive voltage from the voltage measured at the taps. Typically, this involves subtracting out the inductive voltage by comparing the signal to a reference voltage. The reference voltage can be from a sense coil monitoring the magnetic field, or may be a voltage taken from a voltage tap in a different part of the inductor. In any event, the technique involves subtracting two voltage measurements, one entirely inductive and the other mostly inductive, but also having a small resistive component with the hope of recovering that small resistive component. It is understood that "inductive" as used here means that the phase of the voltage is that phase which would be produced by a pure inductor, i.e., the voltage is proportional to the time rate of change of the current. The entirely inductive voltage could be derived by other means, such as an electronic differentiating machine.

As mentioned above, the inductive voltage across the inductor's terminals may be tens of kilovolts during normal operation. This means the sensor must be floated at these high voltages. This places a severe constraint upon any electronic components attached to the voltage taps to measure and detect a quench since these components must be designed to operate at these high inductive voltages. Also, since the components must be placed close to the voltage taps, they must be capable of operating properly at cryogenic temperatures and in high magnetic fields.

It would be desirable, therefore, to develop a sensor for quench detection in superconductors under operating and quiescent conditions wherein a quench can easily be detected without encountering the difficulties mentioned above.

SUMMARY OF THE INVENTION

The present invention relates to a sensor for detecting a quench in a superconducting inductor or magnetic coil. The sensor directly detects the resistive voltage caused by the presence of a normal zone in the superconductor. It operates in the hostile environment of cryogenic temperatures and high magnetic field which pose a significant problem for more conventional sensors and detection methods. It efficiently eliminates the problems associated with measuring small voltage changes in the presence of a high common mode voltage, since it is self-powered and uses only optical fibers to communicate information to an operator.

There are several important advantages with the present sensor and method for quench detection in large superconducting coils. For example, the sensor is fairly simple and works well in hostile environments. It takes advantage of the high magnetic field of the coil and does not require any electrical penetrations into the vacuum space. Instead, all of the information gathered by the sensor is optically coupled and carried out of the system by means of a fiber optic cable. As a result, the sensor is not susceptible to electrical interference. It also is not affected by the high "common mode" voltage present between turns of the coil.

The quench detector of the present invention is electrically connected to the superconducting coil through two "potential leads" which preferably monitor one turn of the coil. These leads are attached to a readout coil of wire which is mounted near the superconducting coil in close enough proximity to be immersed in the substantial magnetic field which the coil produces. This location places the readout coil in the high magnetic field of the superconducting coil which is perpendicular to the windings of the superconducting coil.

The readout coil may consist of a number of turns of wire, mounted in such a way that it is movable. It is intended that the current which flows in the readout coil cause motion in that coil in the same way that current induces motion in a meter movement. In a meter movement, an external magnetic field is imposed on a coil of wire which carries current such that the resulting force causes a deflection of a vane which is indicative of the amount of current flowing in the coil.

In the present sensor, the external field is provided by the magnetic field of the superconducting coil. The restoring force for the readout coil can be provided by the leads which carry the current to it the readout coil and lead assembly form an apparatus reminiscent of a "taut band" type of meter movement. Other means of providing the restoring force can easily be used by one skilled in the art such as a mechanical spring or a weight attached to the moveable coil.

The magnetic field available in the superconducting coil is typically over one Tesla in the area where the readout coil of the sensor is located. This field strength is considerably greater than that found in conventional meter movements. Furthermore, the readout coil size is not limited as it is in a meter movement. As a result, the present sensor is able to be sensitive to currents in the microampere range, although this degree of sensitivity is not required for many large scale applications.

In a meter movement, the applied magnetic field is constrained by the manufacturing process to be perpendicular to the plane of the coil at all deflections. In the sensor of the present invention, such a meter movement is not practical due to the fixed direction of the external magnetic field. Since the torque on the readout coil is proportional to the vector product $A \times B$, where A is the magnetic moment of the readout coil, and B is the magnetic field intensity of the superconducting coil, the initial orientation of the readout coil is such that the vector product is maximized initially—that is, the external magnetic field is in the plane of the readout coil and perpendicular to the axis about which the coil rotates. As the readout coil deflects due to the increased current through it, the sensitivity becomes less according to the sinusoidal relationship inherent in the vector product. However, the initial deflection indicates the onset of a quench since normally no current will be flowing. Maximum sensitivity, therefore, occurs at the onset of a quench.

Enhanced sensitivity for quench detection by the readout coil can be obtained by providing a balancing reference voltage or bucking signal which effectively removes the dI/dt term from the superconducting coil voltage at the voltage taps. One way to conveniently obtain this signal is to wind a second compensating coil immediately adjacent to the superconducting coil, following a path as nearly identical to the primary coil as possible. This compensating coil is then inserted in series with the voltage taps which are attached to the primary coil in such a way that the induced voltage of the compensating coil opposes the induced voltage of the superconducting coil. The net voltage which results is representative of only the resistive component. This voltage causes current to flow through the readout coil when a quench occurs, producing the desired deflection.

The remote indication of the change of position of the readout coil is preferably provided by an optical encoder which influences a beam of light conducted to and returned from the sensor assembly by means of two or more optical fibers. Optical fibers are extremely rugged, work well at cryogenic temperatures, and may penetrate the vacuum space at any convenient location, such as the top of the chamber. As a result, the light source and light sensor can be located remotely from the readout coil.

Other details, objects and advantages of the present invention will become more readily apparent from the following description of the presently preferred embodiments thereof.

BRIEF DESCRIPTION OF THE DRAWINGS

In the accompanying drawings, preferred embodiments of the present invention are illustrated, by way of example only, wherein.

DESCRIPTION OF THE PREFERRED EMBODIMENTS

Figure 1:
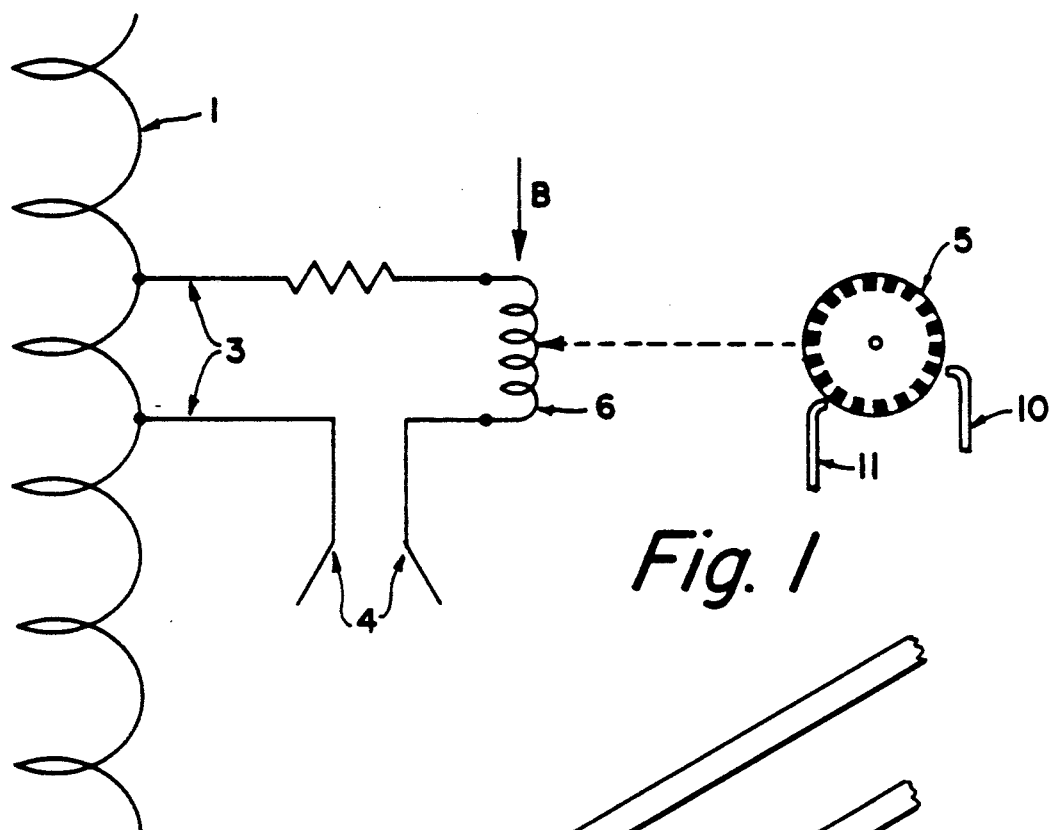
FIG. 1 shows a schematic of the quench detector of the present invention.

FIG. 1 shows a schematic of the quench detecting sensor of the present invention. Superconductor coils 1 are monitored with parallel voltage taps 2 connected by wires 3 to readout coil 6. Readout coil 6 and an integrally configured rotary encoder 5 are rotatably mounted. The location of readout coil 6 near the superconductor coil places it in the high magnetic field of the superconductor, oriented primarily in the direction indicated by arrow "B" as shown FIG. 1. A balancing reference voltage as discussed above may be injected through wires 4 which are connected to a compensating coil 4a. Readout coil 6 is comprised of a number of turns of wire, mounted in such a way that it is movable. It is intended that the current which flows in the readout coil cause motion in that coil exactly in the manner that current induces motion in a meter movement. In the present quench detector, the external magnetic field B which is imposed on readout coil 6 generates a resulting force when the readout coil carries current such that it causes a deflection of rotary optical encoder 5 which is indicative of the amount of current flowing in readout coil 6. Rotation of rotary encoder 5 influences light in fiber optic cable 10 from a light source on its way to a sensor through fiber optic cable 11, so as to indicate the presence of a quench condition in the superconductor coil. By using fiber optic cables 10 and 11, the light source and the sensor can be located remotely from the quench detector and outside the effects of the high magnetic field B and the cryogenic temperatures.

Figure 2:
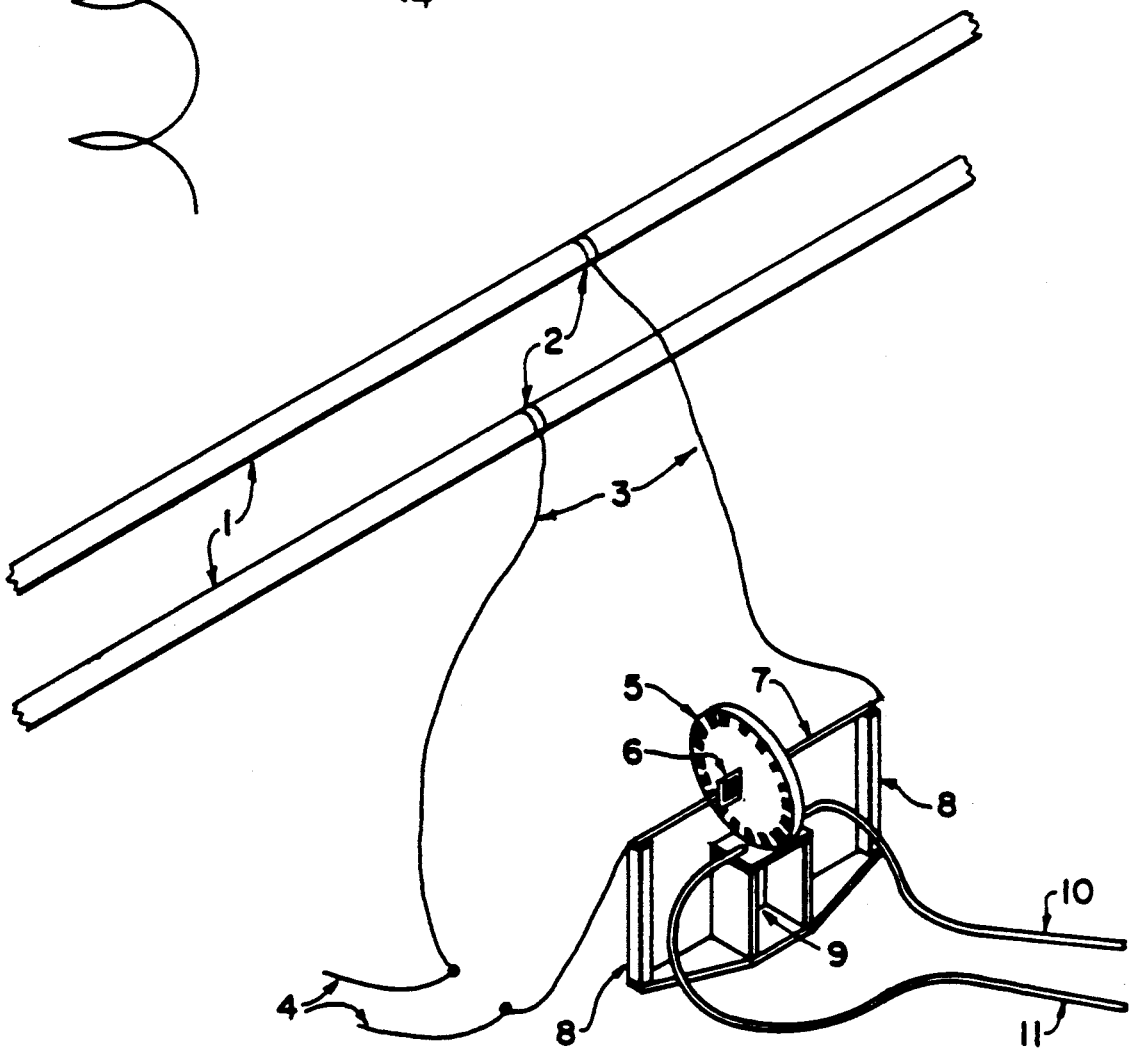
FIG. 2 shows one embodiment of the quench detector of the present invention.

One embodiment of the quench detector is shown in FIG. 2. In this embodiment, superconductor coils 1 are monitored via voltage taps 2; connecting wires 3 carry the sensing current into the sensor circuit. The inductive voltage from voltage taps 2 may be diminished by using a bucking signal added to the sensing circuit via wires 4, which effectively removes much of the dI/dt component. Rotary optical encoder 5 in FIG. 2 and an integrally configured readout coil 6 are rotatably mounted on axis 7, which is held in place with support means 8. Axis 7 is a flat taut band, that permits the rotary encoder to move no more than 90° in either direction while at the same time balancing the rotary encoder 5 to return it to its original position in the absence of a sensed current resulting from the existence of a quench condition in the superconductor coil. Rotation of rotary encoder 5 is detected by light sensor at the end of optic fiber 11. FIG. 1 shows a quench detector wherein optic fiber 10 emits light that is either reflected by or passes through rotary optical encoder 5 and into optic fiber 11. Support means 9 holds optic fibers 10 and 11 in an aligned position near the edge of the rotary optical encoder.

Figure 3A:
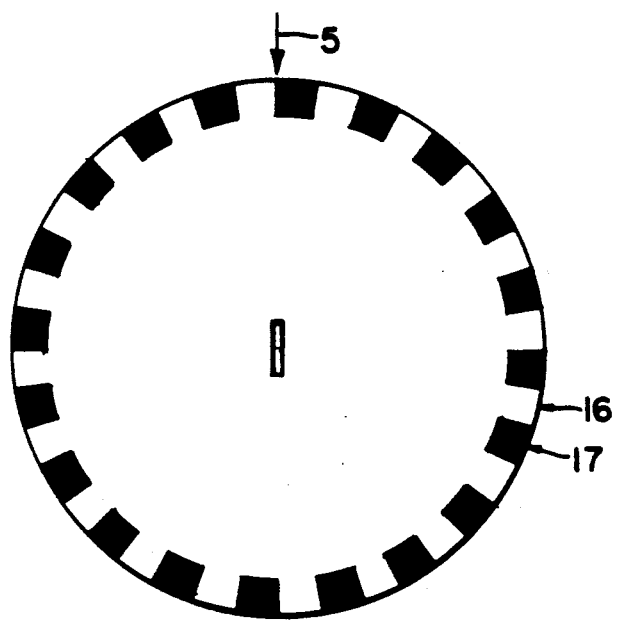
FIGS. 3A, 3B, 3C, 3D and 3E show various embodiments of the rotary encoder for the quench detector of the present invention.

FIG. 3A shows a side view of the quench detector rotary optical encoder 5 used in the FIG. 2 embodiment. Fiber optic light source 10 emits light that passes through rotary optical encoder 5 and into fiber optic light sensor 11 at location 16, but is prevented from passing into fiber optic light sensor 11 at location 17.

Figure 3C:
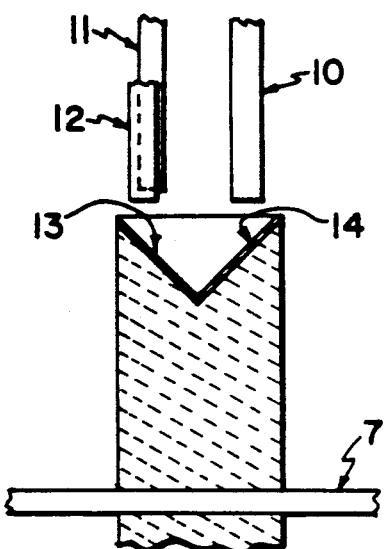
Figure 3D:
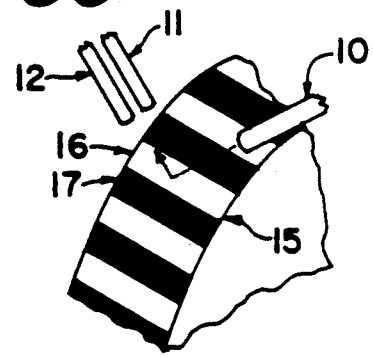
Figure 3B:
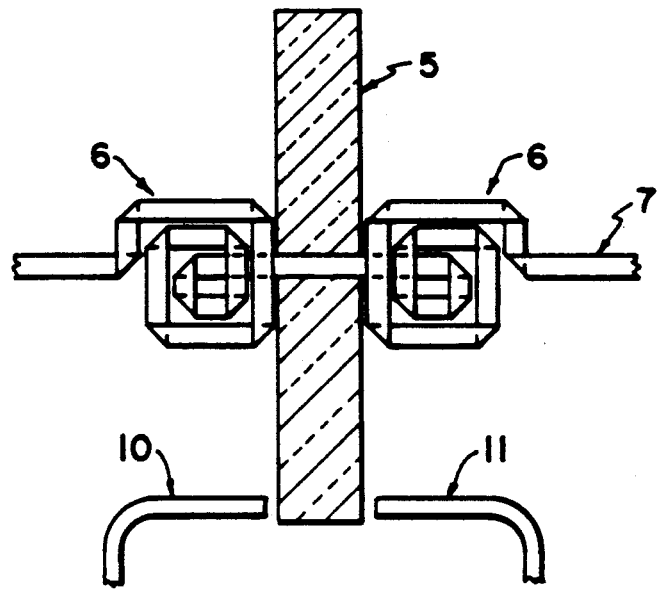

FIG. 3B shows an end view of the quench detector rotary optical encoder 5 as shown in FIG. 2 integrally mounted to readout coil 6 on axis 7, with fiber optic light source 10 which emits light that intermittently passes through rotary optical encoder 5 and into fiber optic light sensor 11 as it rotates. The greater the rotation, the larger the resistive voltage due to a quench.

Another embodiment of the quench detector rotary optical encoder 5 is shown in FIG. 3C where the circumference of the rotary optical encoder 5 has areas that reflect or absorb light, depending on its rotational position. Rotary encoder 5 can have angled reflective surfaces 13 and 14 such that fiber optic light source 10 directs light that is reflected off surface 14 and then surface 13 into fiber optic light sensors 11 and 12. When rotary optical encoder 5 rotates in a clockwise direction, fiber optic light sensor 11 will always be the first light sensor to sense light from light source 10. When rotary optical encoder 5 rotates in a counterclockwise direction, fiber optic light sensor 12 will always be the first light sensor to sense light from fiber optic light source 10. Depending on the direction rotary optical encoder 5 turns, the light from fiber optic light source 10 will be reflected into fiber optic light sensors 11 and/or 12, or absorbed by the striped pattern of light reflecting areas 16 and light absorbing areas 17 (such as shown in FIG. 3D) as they pass by due to the turning of rotary optical encoder 5 beneath fiber optic light source 10 and fiber optic light sensors 11 and 12, so as to indicate both the direction and degree of rotation of the rotary optical encoder 5 according to the strength of the resistive voltage, thereby indicating the relative severity of the quench condition in the superconducting coil and in which turn it is occurring.

Figure 3E:
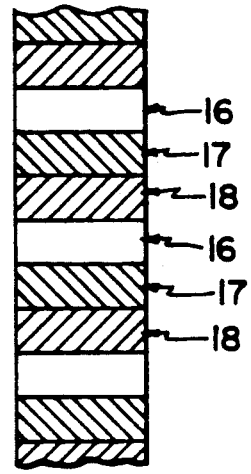

It will be appreciated by those skilled in the art that there are other viable means of determining the direction of a rotary transducer and that this is only one of accomplishing the desired result. Another way, employs a second pattern on the rotating member instead of a second fiber sensor such as shown in FIG. 3E. The second pattern, for example, could consist of a second set of colored areas 18 that could easily be sensed through the same optical fiber that senses light and dark.

In still another embodiment, the circumference of the rotary optical encoder 5 has areas 16 that reflect light and areas 17 that absorb light, depending on the rotary encoder's rotational position (FIG. 3D). In this embodiment, rotary encoder 5 has a single flat reflective surface 15 (rather than reflective surfaces 13 and 14 as shown in FIG. 3C). Fiber optic light source 10 and fiber optic light sensors 11 and 12 are angled towards surface 15 so that when rotary optical encoder 5 rotates in a clockwise direction, fiber optic light sensor 11 will first sense light from fiber optic light source 10, or that when rotary optical encoder 5 rotates in a counterclockwise direction, fiber optic light sensor 12 will first sense light from fiber optic light source 10. Again, depending on the direction rotary optical encoder 5 turns, the light from fiber optic light source 10 will be reflected or absorbed by the pattern of areas 16 and 17 as they pass by due to the turning of rotary optical encoder 5 so as to indicate both the direction and degree of rotation of the rotary optical encoder.

Figure 4:
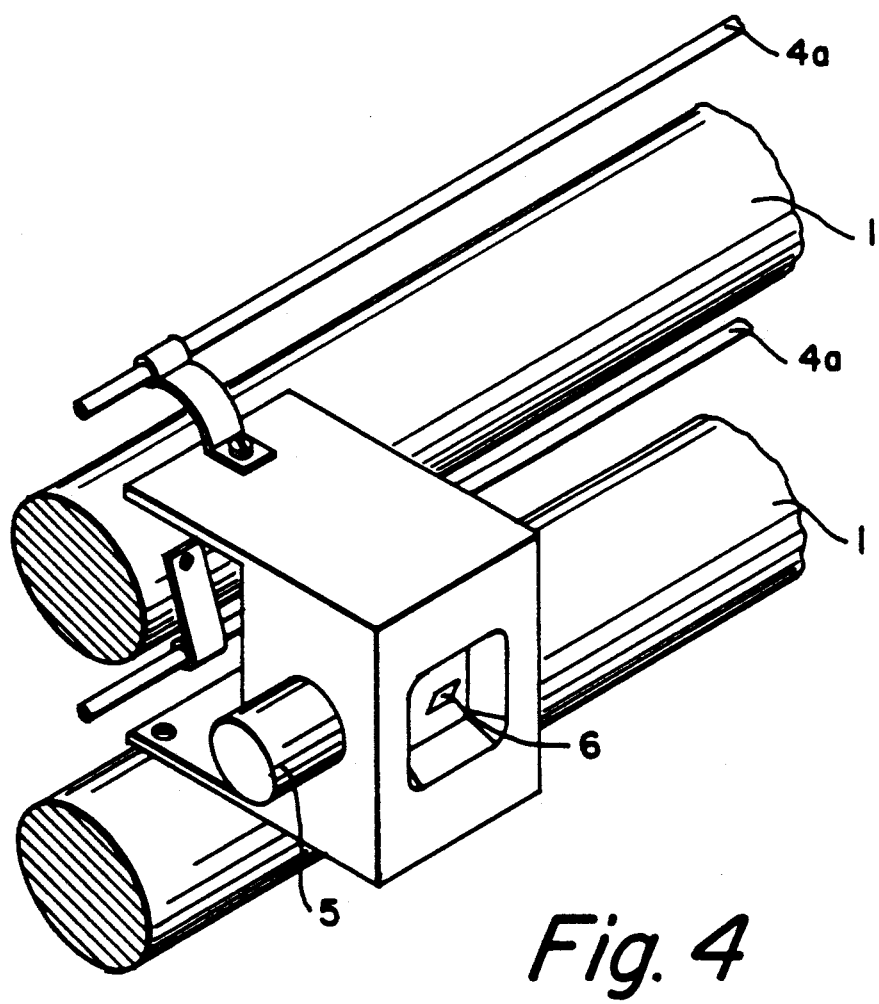
FIG. 4 shows another embodiment of the quench detector of the present invention.

FIG. 4 shows another embodiment of the present invention. It particularly shows the placement of the quench detector in close proximity to the superconducting coil 1. It also shows the compensating coil 4a wound parallel to, or in a bifilar manner with, the superconducting coil 1 which is used to generate the balancing reference voltage or bucking signal.

While presently preferred embodiments of practicing the invention have been shown and described with particularity in connection with the accompanying drawings, the invention may otherwise be embodied within the scope of the following claims.

We claim:

1. A sensor for detecting a quench in a superconducting coil comprising:
   a readout coil located in a magnetic field produced by the superconducting coil that will move in response to a current flow between two potential leads connected to voltage taps on the superconducting coil caused by the presence of a quench in the superconducting coil;
   at least one light source;
   at least one light sensor aligned with the light source;
   an optical encoder integrally attached to the readout coil and capable of interrupting light emitted by the light source and impinging on the light sensor;
   a means of biasing the readout coil to return it to an original position when a quench is not present in the superconducting coil; and
   a means of remotely decoding the transmitted and interrupted light received by the light sensor to indicate the presence of a quench in the superconducting coil.

2. A sensor for detecting a quench in a superconducting coil as described in claim 1 wherein the readout coil is rotatable.

3. A sensor for detecting a quench in a superconducting coil as described in claim 2 wherein the optical encoder has a means to reflect light from the light source into a first light sensor to indicate when the readout coil rotates in the clockwise direction, and wherein the optical encoder has a means to reflect light from the light source into a second light sensor to indicate when the readout coil rotates in the counterclockwise direction.

4. A sensor for detecting a quench in a superconducting coil as described in claim 2 wherein the optical encoder has at least one reflective surface to reflect and transmit light from the light source into a plurality of light sensors to indicate the direction and degree of rotation of the readout coil according to the magnitude of the resistive voltage in the superconducting coil, thereby indicating the relative severity of the quench.

5. A sensor for detecting a quench in a superconducting coil as described in claim 1 wherein the light source and the light sensor are comprised of fiber optic material.

6. A sensor for detecting a quench in a superconducting coil as described in claim 1 wherein any inductive voltage detected by the sensor is negated by using a balancing reference voltage from a compensating coil wound parallel to the superconducting coil.

7. A sensor for detecting a quench in a superconducting magnet having at least a pair of coils, the quench detector comprising:
   a voltage tap connected to each of said coils;
   a compensating coil having first and second leads and disposed adjacent said coils of the superconducting magnet to provide a balancing reference voltage so as to negate any inductive voltage sensed by the quench detector;
   a readout coil rotatably disposed in a magnetic field produced by the superconducting coil and having two potential leads, wherein one of said voltage taps is connected to the first lead of the compensating coil and the other voltage tap is connected to one of said potential leads, and the other of said potential leads of the readout coil is connected to the second lead of the compensating coil, such that the readout coil is caused to move in response to a current flow caused by the presence of a quench within the superconducting magnet;
   an optical encoder, operatively associated with rotatably attached to the readout coil so as to be rotatable therewith; of the optical encoder;
   light sensing means disposed on an opposite side of the optical encoder so as to receive light emitted by the light source; and
   means for remotely decoding light received by the light sensor to indicate the absence or presence of a quench in the superconducting coil.

8. The quench detector as recited in claim 7, wherein the readout coil is disposed perpendiculary with respect to the direction of the magnetic field produced by the superconducting magnet.

9. The quench detector as recited in claim 8, wherein the compensating coil is wound parallel to said coils of the superconducting magnet.

10. The quench detector as recited in claim 8, wherein the optical encoder includes means to reflect light from the light source into a first light sensor to indicate when the readout coil rotates in a clockwise direction, and wherein the optical encoder includes means to reflect light from the light source into a second light sensor to indicate when the readout coil rotates in a counterclockwise direction.

11. The quench detector as recited in claim 8, wherein the optical encoder has at least one reflective surface to reflect and transmit light from the light source into a plurality of light sensors to indicate the direction and degree of rotation of the readout coil according to the magnitude of the resistive voltage in the superconducting coil, thereby indicating the relative severity of the quench.

12. The quench detector as recited in claim 8, wherein the light source and said light sensing means are comprised of fiber optic material 13. The quench detector as recited in claim 7, wherein the compensating coil is wound parallel to said coils of the superconducting magnet.

14. In a superconducting magnet having at least a pair of coils made of superconducting material, a method of detecting the presence of a quench within said coils, the method comprising the steps of:
   connecting a voltage tap to each of said coils;
   placing a rotatable readout coil having two potential leads within a magnetic field produced by the superconducting coil, said two potential leads being operably associated with said voltage taps such that the readout coil is caused to move in response to a current flow caused by the presence of a quench within the superconducting magnet;
   providing a balancing reference voltage for the readout coil so as to negate any inductive voltage sensed by the quench detector;
   attaching an optical encoder to the readout coil so as to be rotatable therewith;
   placing a light source on one side of the optical encoder so as to direct light thereon;
   placing light sensing means on an opposite side of the optical encoder so as to receive light emitted by the light source; and
   decoding light received by said light sensing means to indicate the absence or presence of a quench in the superconducting coil.

15. The method as recited in claim 14, wherein the step of placing a readout coil within the magnetic field comprises disposing the readout coil such that a vector normal to a plane in which it lies is perpendicular to the magnetic field.

16. The method as recited in claim 14, wherein the step of providing a balancing reference voltage comprises placing a compensating coil parallel to said coils of the superconducting magnet, the compensating coil having a first lead connected to one of said voltage taps and a second lead connected to one of said potential leads of the readout coil, the other of said potential leads being connected to the other voltage tap.

17. The method as recited in claim 14, wherein the optical encoder includes means to reflect light from the light source into a first light sensor to indicate when the readout coil rotates in a clockwise direction, and wherein the optical encoder includes means to reflect light from the light source into a second light sensor to indicate when the readout coil rotates in a counterclockwise direction.

18. The method as recited in claim 14, wherein the optical encoder has at least one reflective surface to reflect and transmit light from the light source into a plurality of light sensors to indicate the direction and degree of rotation of the readout coil according to the magnitude of the resistive voltage in the superconducting coil, thereby indicating the relative severity of the quench.

* * * * *